United States Patent [19]
Stölting et al.

[11] 3,862,594
[45] Jan. 28, 1975

[54] CONVEYING APPARATUS

[75] Inventors: Klaus Stölting; Hans-Georg Zimmermann, both of Wiesbaden-Biebrich; Ewald Klos, Taunusstein, all of Germany

[73] Assignee: Kalle Aktiengesellschaft, Wiesbaden-Biebrich, Germany

[22] Filed: Dec. 29, 1972

[21] Appl. No.: 319,166

[30] Foreign Application Priority Data
Nov. 17, 1972 Germany............................ 2256409

[52] U.S. Cl................ 100/95, 100/145, 425/302, 425/376
[51] Int. Cl............................................ B30b 11/24
[58] Field of Search .......... 241/82.4; 259/191, 192, 259/193; 425/207, 208, 202, 309, 376; 100/145, 117, 98 R, 94, 95

[56] References Cited
UNITED STATES PATENTS

| | | | |
|---|---|---|---|
| 766,260 | 8/1904 | Jaques | 425/208 |
| 1,353,917 | 9/1920 | Lambert | 425/208 |
| 2,620,752 | 12/1952 | Braibanti et al. | 425/376 X |
| 2,926,619 | 3/1960 | Kruder | 259/191 |
| 3,044,391 | 7/1962 | Pellett | 425/202 |
| 3,394,649 | 7/1968 | Kemper et al. | 100/117 |
| 3,581,655 | 6/1971 | Hausmann | 425/202 |

FOREIGN PATENTS OR APPLICATIONS

| | | | |
|---|---|---|---|
| 996,647 | 6/1965 | Great Britain | 100/145 |
| 1,127,727 | 9/1968 | Great Britain | 100/117 |
| 59,723 | 8/1938 | Norway | 100/145 |
| 111,241 | 7/1944 | Sweden | 241/82.4 |

*Primary Examiner*—Billy J. Wilhite
*Attorney, Agent, or Firm*—James E. Bryan

[57] ABSTRACT

A conveying apparatus and process for transporting moist, crumbly material from a first room to a second room, in which the gas pressure is different from that of the first one, comprising a feed section, a compression section, and an end section, a shaft extending through the three sections and carrying conveyor screws in the feed and compression sections only. In the end section, an annular plug of the material is formed. In the compression section, the cross-section between the conveyor screw and/or the housing around it decreases in the direction of transport, and the housing is internally screw-threaded.

8 Claims, 3 Drawing Figures

CONVEYING APPARATUS

This invention relates to an apparatus for conveying crumbly moist material.

German Offenlegungeschrift 1,442,746 discloses devices for conveying cellulosic material between chambers of different pressure, comprising screw conveyors which form plugs of the material which are released at the discharge end as pressure-resistant lumps which must be broken up in a complicated manner. A conveyor device is therefore described comprising one screw conveyor or, more preferably, two interlocking screw conveyors having an interruption in their worm threads, where the plug of material is formed which is subsequently broken by the following portion of the worm thread. Such devices wear away relatively quickly.

German Auslegeschrift 1,127,334 similarly describes a device comprising screw conveyors which form a plug of material at their discharge end. This plug is relatively porous, however, so that in order to seal against considerable differences in pressure several of these screw conveyors must be arranged in labyrinthine passages, necessitating the presence of larger amounts of material and more space than a device having only one screw conveyor.

The present invention provides apparatus for conveying a moist, crumbly material which comprises, arranged in order; a feed section comprising a screw conveyor having a cylindrical cover and a cylindrical housing therefor in which the cross-sectional area between the screw conveyor and the housing remains substantially constant; a compression section comprising a conveyor screw and a housing therefor, the cross-sectional area between the screw conveyor and the housing decreasing in the direction of conveyance and the housing being internally screw-threaded with a pitch smaller than and in a sense opposite to that of the screw threading of the screw conveyor; a screwless cylindrical end section in which an annular plug of the material can be formed; and stripping means provided at the outlet of said end section.

The necessary compression in the compression section is, in general, obtained by a conical shaping of the screw conveyor and/or the housing. In the commercially preferred embodiments of the apparatus, the screw conveyor housing is tapered conically in the direction of conveyance and the screw conveyor has a cylindrical core with threads the depth of which decreases in the same direction.

Preferably, a further feed conveyor screw is arranged at a right angle to the main conveyor screw above the start of the latter.

In practice, the conveyor screws and housings of the feed section, the compression section and the end section may be built as individual units with the screw conveyor units being mounted about a single shaft extending through the housing units.

The stripping means preferably comprises two or more blades arranged on the shaft beyond the end section so that they form a milllike cutter head.

In the commercially preferred embodiments of the apparatus according to the present invention, the following features are preferred. These preferred features will, however, also be generally applicable to other forms of apparatus according to the present invention.

The course of the thread of the screw conveyor in the conical compression section preferably has the same or about the same pitch as that in the cylindrical section; the pitches in the two sections preferably differing from one another at the most by 10 percent. In the feed section the pitch is advantageously not greater than the external diameter of the screw conveyor thread and not smaller than three-fourths thereof. The pitch of the internal thread which is found in the conical compression section of the screw conveyor housing is, in contrast, smaller than the pitch of the screw conveyor thread, preferably in the ratio of from 1 : 0.25 to 1 : 0.75. The degree of tapering in the conical section of the screw conveyor housing is such that the decrease in volume intended on compression of the material is distributed over at least two thread courses of the screw conveyor; the decrease in volume is generally of the order of magnitude of 2 : 1. The cylindrical end section of the housing in which the material plug is produced is preferably from five to 12 times as long as the difference between the outer and inner radius of the material plug which is formed therein. Thus, for example, in a device in which the initial screw conveyor radius is 35 mm greater than the radius of the core of the screw conveyor, the material plug may form as a hollow cylinder having 25 mm wall thickness and 230 mm length. The thread of the screw conveyor does not contact the housing wall, and is generally spaced apart therefrom at a distance of 2 to 5 mm.

The apparatus of the present invention achieves good sealing effects but necessitates only small amounts of material and space. For example, using the apparatus of the present invention, alkali cellulose consisting of one part by weight of pulverized cellulose and 1.5 to 2.2 parts by weight of 20 to 50 percent soda lye can be conveyed against pressures of up to 50 kg/cm$^2$ and higher, being homogenized during the course of the conveying process and finally converted into crumbly form.

Three forms of apparatus according to the present invention will now be described, by way of example only, with reference to the accompanying drawings, in which.

Figure 1:
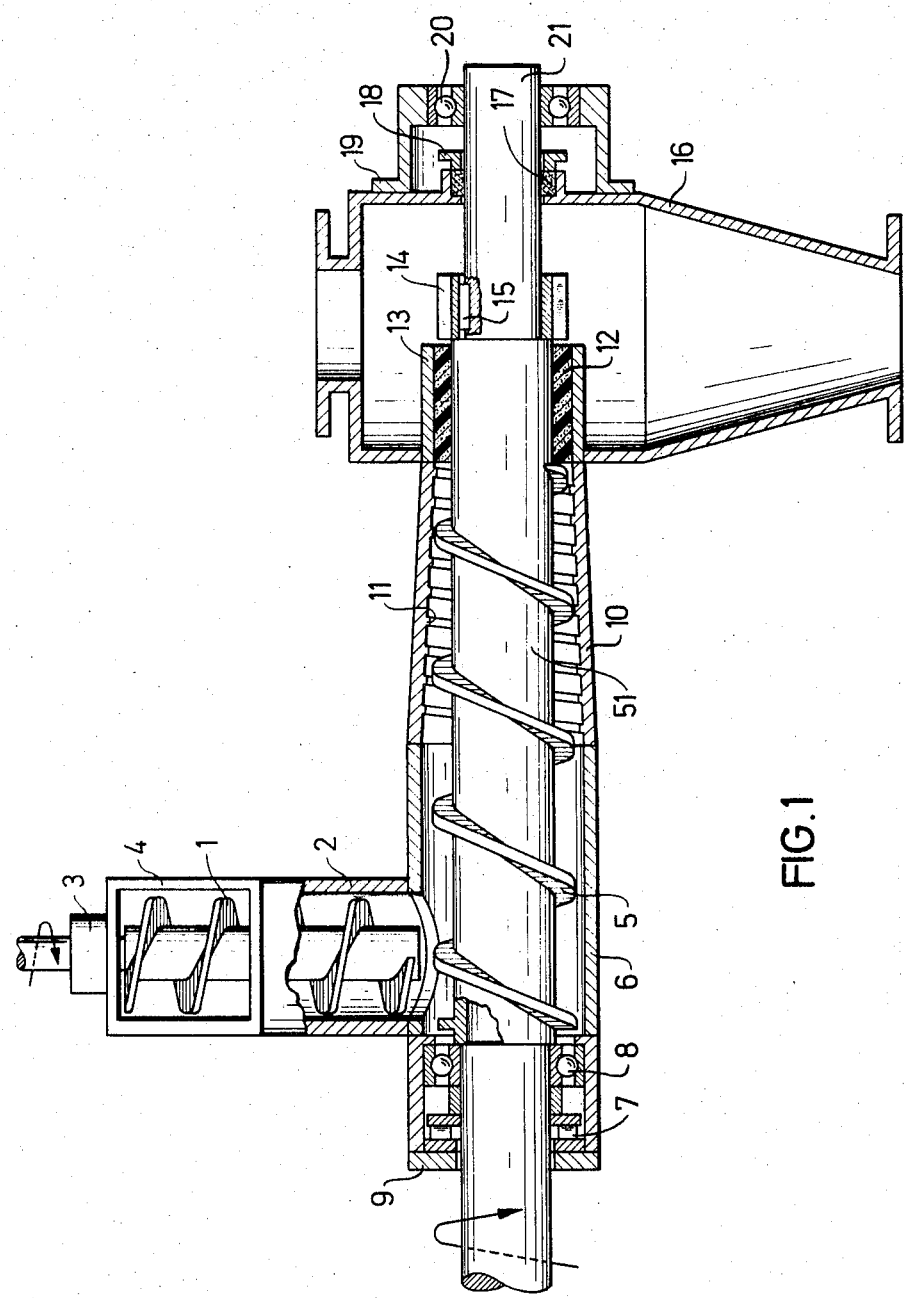
FIG. 1 is a generally sectional view taken along the length of the commercially preferred embodiment of apparatus according to the present invention.

Referring now to FIG. 1, the apparatus shown has a counterclockwise screw conveyor 5, which is mounted on a screw conveyor shaft 21. The latter is horizontally mounted at one end in a support bearing 8 and at its other end in a support bearing 20, and is located within a screw conveyor housing which has a cylindrical feed portion 6, and connected thereto a tapering conical compression section 10 which is itself connected to a cylindrical end section 13. The inside wall of the conical compression section 10 is provided with thread courses 11, which are clockwise and the pitch of which is less than those of the conveyor core 51. The section 51 of the screw conveyor core located in the compression section 10 is cylindrical as in the feed section 6, the depth of the threads thereon decreasing in the direction of conveyance. The screw conveyor housing is closed at one end by a bearing plate 9 and at the other side by a bearing spacer 19. The screw conveyor is pressed by means of the conveying pressure it exerts against the bearing plate 9, the pressure being absorbed by an axial bearing 7. At the other end, the shaft 21 is sealed by a stuffing box 17 and a gland 18. The thread of the screw conveyor stops before the cylindrical end section 13, the material plug 12 being formed in the latter. Behind the cylindrical end section 13 are arranged two or more strippers 14 which are connected to the shaft 21 by fitting keys 15 at a small distance, approximately 2 to 10 mm, from the end of the screw conveyor housing. The delivery end of the screw conveyor is enclosed by a discharge housing 16.

Above the start of the screw conveyor 5 and vertical thereto there is arranged a feed screw conveyor 1 which is horizontally mounted in a bearing 3 and is located in a housing 2. Above the feed screw conveyor is mounted a perpendicular charging hopper 4.

In operation, the crumbly, moist material to be conveyed falls through the charging hopper 4 into the feed screw conveyor 1. This is driven such that its conveying capacity is greater than that of the screw conveyor 5, so that material is constantly supplied to the latter. The material conveyed is compressed mainly in the conical compression section 10. The internal thread 11 in the housing ensures, as a result of its opposing thread direction, that the material, if it should tend to follow the rotation of the conveyor screw, is transported forwardly in the axial direction. The material plug 12 formed in the end section 13 is moved axially through the same by the material pushed after it. The material has its greatest compression in the plug and it is there homogenized by the squeezing out of liquid from over wet particles and the uniform distribution of the liquid by means of diffusion and wetting to all solid particles during the residence period in the end section 13. Then the strippers 14 convert the compact material plug 12 back into a material of a fine crumbly nature. The apparatus can be driven with a good conveying efficiency at a speed of between one and 50 revolutions per minute. The conveying efficiency depends on the properties of the material, in particular on the moisture content of the material to be conveyed and on its temperature. Depending on the material and the pressure differential it is generally between 20 and 60 percent. The shaft of the screw conveyor can, of course, be hollow, for the purpose of conducting a cooling or heating medium, for example. The screw conveyor and the inner wall of the screw conveyor housing are advantageously chrome-plated and polished.

In a commercially preferred form of the apparatus of FIG. 1, the volume within one thread course, between the housing and the screw conveyor was 1.41 in the feed section 6 and 0.71 at the end of the compression section 10. The screw conveyor had an external diameter of 140 mm, a core diameter of 70 mm and a pitch of 120 mm. The external diameter of the cylindrical end section was 110 mm. At a travelling speed of 10 revolutions per minute, 300 kg of material per hour were carried through, corresponding to a conveying efficiency of 50 percent. conveying apparatus of greater dimensions than those mentioned above has enabled correspondingly higher conveying capacities.

Figure 2:
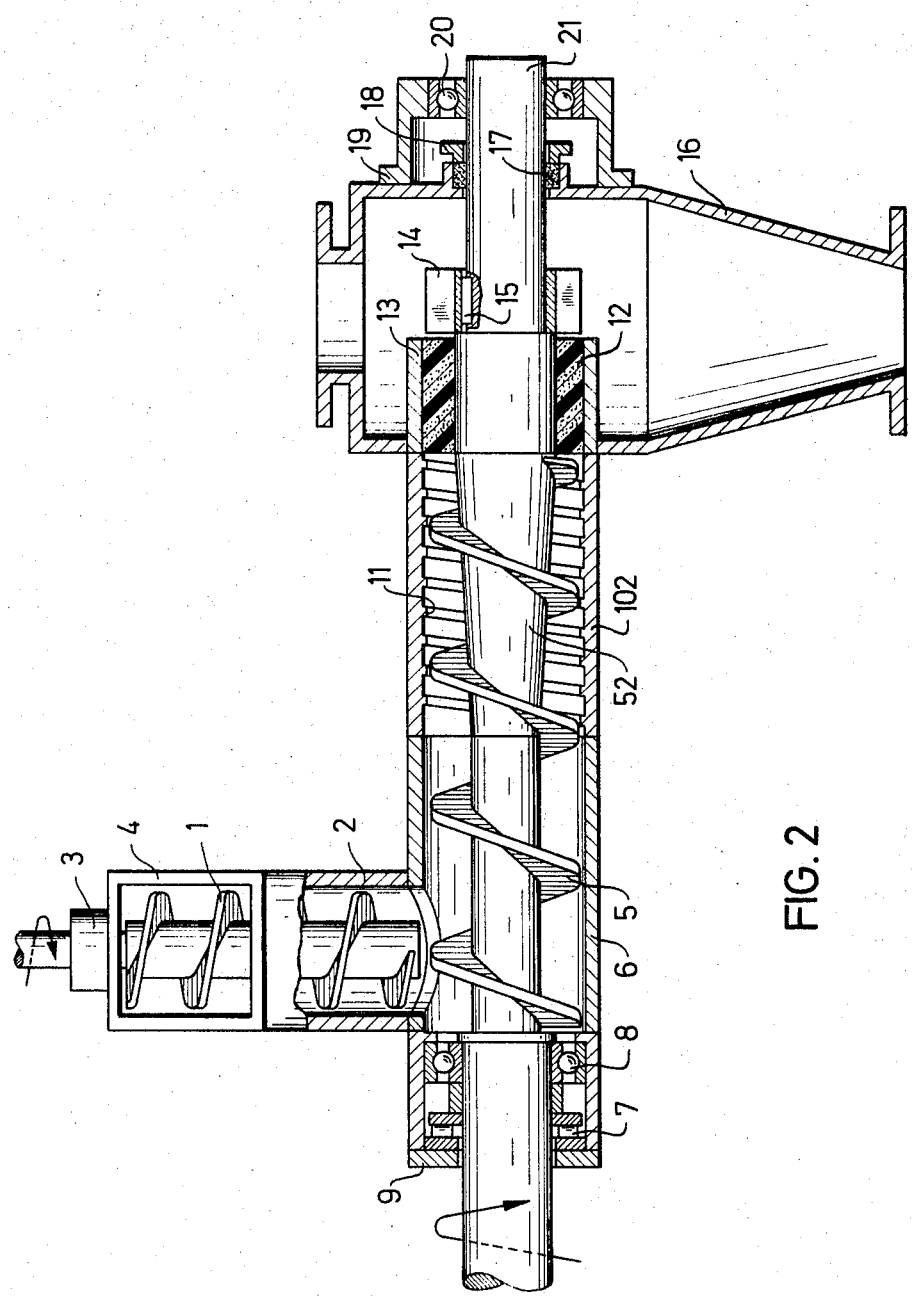
FIG. 2 is a generally sectional view taken along the length of a second form of apparatus according to the present invention.

FIG. 2 illustrates apparatus in which the desired compression is achieved by forming the core 52 of the screw conveyor within the compression section 10 as a growing cone, the housing 102 of that section being uniformly cylindrical.

Figure 3:
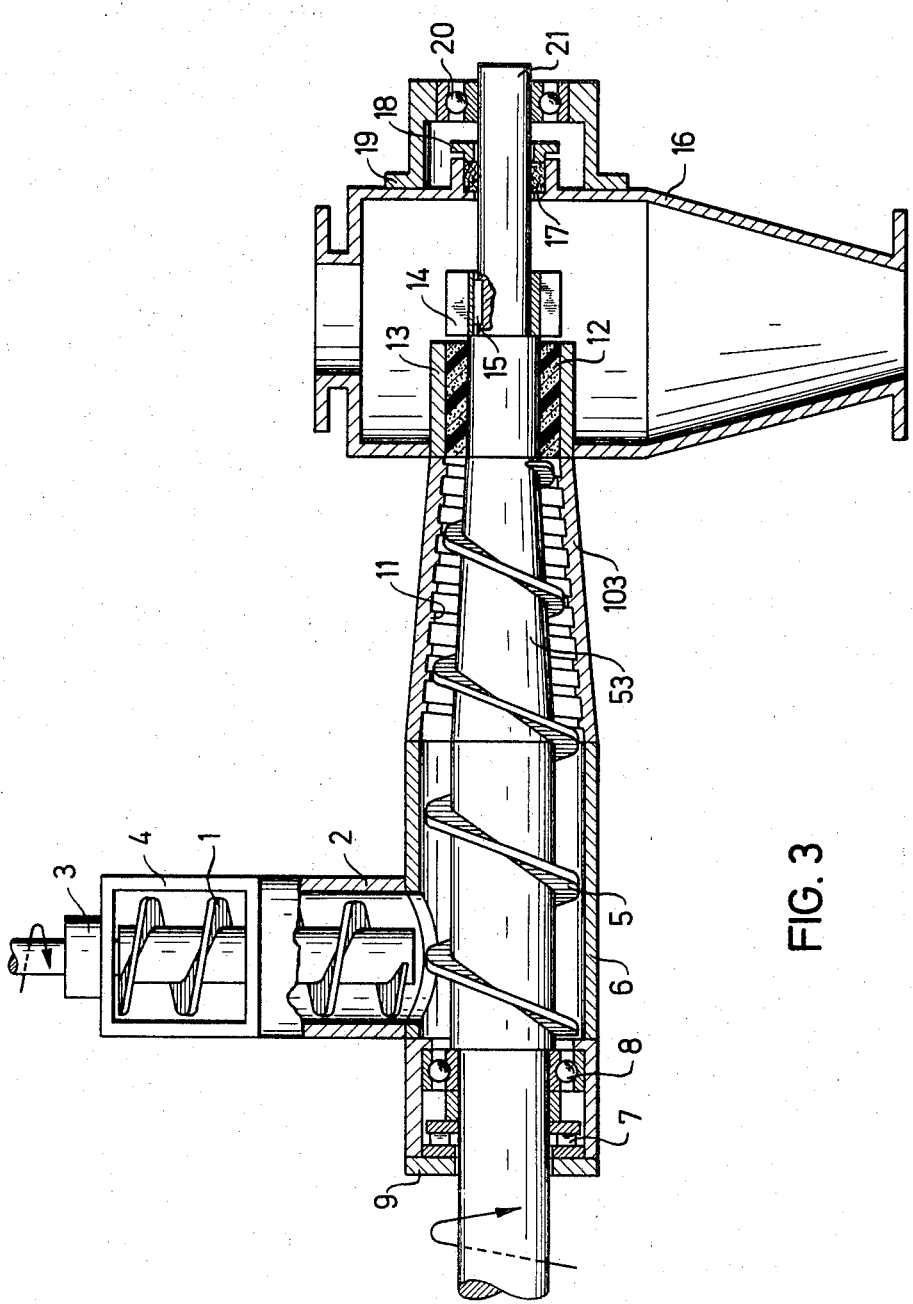
FIG. 3 is a generally sectional view taken along the length of a third form of apparatus according to the present invention.

FIG. 3 illustrates apparatus in which in the compression section 10 both the screw conveyor housing 103 and the screw conveyor core 53 are of a conical shape tapering in the direction of conveyance. In this case, the relative tapering of the core and the housing must be chosen so that the required degree of compression is achieved. It would, of course, also be possible for the core and the housing to taper conically in the opposite direction or for the housing to taper conically in the direction of conveyance and the core to taper conically in the opposite direction. (Of course, no compression would be achieved if the core tapered in the direction of conveyance and the housing tapered in the opposite direction.)

Generally speaking, all the preferred dimensions given for the apparatus of FIG. 1 apply to that of FIGS. 2 and 3.

Compared to the hitherto proposed devices, the apparatus of the present invention is smaller and less expensive to construct. Furthermore, no metallic friction occurs in operation and there is less wear. There are accordingly fewer restrictions as regards the materials which can be used in its construction. The sealing capacity is very strong and can be maintained for a prolonged period by the plug formed even when the screw conveyor is idle. Good sealing is also achieved with only slightly moist fibrous material. The energy requirement per kg of material passed through is lower than in the hitherto proposed devices.

It will be obvious to those skilled in the art that many modifications may be made within the scope of the present invention without departing from the spirit thereof, and the invention includes all such modifications.

What is claimed is:

1. Apparatus for conveying a moist, crumbly material, which comprises a screw conveyor, a housing enclosing said screw conveyor, and a stripping means, said housing having a cylindrical feed section, a cylindrical end section and, between said feed and end sections, a compression section, said screw conveyor and said housing being cylindrical in said feed section whereby the cross-sectional area between said screw conveyor and said housing is substantially constant, at least one of said screw conveyor and said housing in said compression section being conically shaped whereby the cross-sectional area between said screw conveyor and said housing decreases in the direction of conveyance, said housing being internally screw-threaded with a pitch smaller than and in a sense opposite to that of the screw-threading of said screw conveyor, the core of the screw conveyor being screwless in said end section whereby an annular plug of material can be formed therein, and said stripping means being mounted at the outlet of said end section of said housing.

2. Apparatus as claimed in claim 1 wherein the pitches of the threads of said screw conveyor in said feed and compression sections differ from each other at the most by 10 percent, the pitch of said thread in said feed section being not greater than the external diameter of said thread and not smaller than three-fourths thereof, in said compression section said housing being screw-threaded by at least two thread courses with a pitch which is smaller than that of the screwthreading of said screw conveyor in the ratio from 1 : 0.25 to 1 : 0.75, and said cylindrical end section being five to 12 times as long as the difference between the inner radius of said housing and the radius of said core.

3. Apparatus as claimed in claim 1 wherein, in the compression section, the screw conveyor housing is tapered conically in the direction of conveyance and the screw conveyor has a cylindrical core with threads the depth of which decreases in the same direction.

4. Apparatus as claimed in claim 1 wherein, in the compression section, the housing is substantially cylindrical and the screw conveyor core increases conically in the direction of conveyance.

5. Apparatus as claimed in claim 1 wherein the feed section is provided at its inlet with another feed conveyor screw arranged at a right angle to its own conveyor screw.

6. Apparatus as claimed in claim 1 wherein the end section is from 5 to 12 times as long as the difference between the inner diameter of its housing and the outer diameter of the conveyor core within it.

7. Apparatus as claimed in claim 1 wherein the pitch of the inner thread of the housing in the compression section is from 0.25 to 0.75 of the pitch of screw conveyor threading in said section.

8. Apparatus as claimed in claim 1 wherein the cross-sectional area between the screw conveyor and the housing decreases in the compression section to a value about half that in the feed section.

* * * * *